(12) United States Patent
He (10) Patent No.: US 11,809,884 B2
(45) Date of Patent: Nov. 7, 2023

(54) ELECTRONIC DEVICE AND DRIVING METHOD THEREFOR, DRIVING MODULE, AND COMPUTER-READABLE STORAGE MEDIUM

(71) Applicant: ZTE Corporation, Shenzhen (CN)

(72) Inventor: Wenke He, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 0 days.

(21) Appl. No.: 17/603,027

(22) PCT Filed: Nov. 9, 2020

(86) PCT No.: PCT/CN2020/127478
§ 371 (c)(1),
(2) Date: Oct. 12, 2021

(87) PCT Pub. No.: WO2021/103993
PCT Pub. Date: Jun. 3, 2021

(65) Prior Publication Data
US 2022/0283825 A1 Sep. 8, 2022

(30) Foreign Application Priority Data
Nov. 27, 2019 (CN) .......................... 201911179128.8

(51) Int. Cl.
*G06F 9/451* (2018.01)
*G06F 3/0486* (2013.01)
(Continued)

(52) U.S. Cl.
CPC ............ *G06F 9/451* (2018.02); *G06F 3/0486* (2013.01); *G06F 3/04166* (2019.05);
(Continued)

(58) Field of Classification Search
None
See application file for complete search history.

(56) References Cited

U.S. PATENT DOCUMENTS 5,586,244 A * 12/1996 Berry .................... G06F 3/0481
715/788
9,454,302 B2 * 9/2016 Toriyama .............. A63F 13/426
(Continued)

FOREIGN PATENT DOCUMENTS

| CN | 101650629 | 2/2010 |
| CN | 102193719 A | 9/2011 |

(Continued)

OTHER PUBLICATIONS

International Search Report for corresponding application PCT/CN2020/127478 filed Nov. 9, 2020; dated Jan. 27, 2021.
(Continued)

*Primary Examiner* — Henry Orr
(74) *Attorney, Agent, or Firm* — CANTOR COLBURN LLP (57) ABSTRACT

A driving method for an electronic device is provided. The electronic device includes a touch display panel, and a display surface of the touch display panel is divided into multiple application launching regions. The driving method includes: determining a movement trajectory of a touch point that is at least partially overlapped with the appearance identifier of an application program; and in a case where an end point of the movement trajectory is located in one of the multiple application launching regions, displaying an application interface of the application program in the application launching region in which the end point of the movement trajectory is located.

16 Claims, 7 Drawing Sheets

(51) Int. Cl.
  *G06F 3/04886* (2022.01)
  *G06F 3/041* (2006.01)
  *G06F 3/04817* (2022.01)
(52) U.S. Cl.
  CPC ...... *G06F 3/04817* (2013.01); *G06F 3/04886* (2013.01); *G06F 2203/04803* (2013.01)

(56) References Cited

U.S. PATENT DOCUMENTS

| | | | | |
|---|---|---|---|---|
| 10,585,553 B2* | 3/2020 | Kim | ...................... | G06F 3/0486 |
| 11,567,623 B2* | 1/2023 | Jiang | ...................... | G06F 3/0481 |
| 2005/0188329 A1* | 8/2005 | Cutler | ................... | G06F 3/0481 |
| | | | | 715/788 |
| 2012/0084681 A1* | 4/2012 | Cassar | ................... | G06F 3/0481 |
| | | | | 715/761 |
| 2013/0215040 A1* | 8/2013 | Bose | ................... | G06F 3/04883 |
| | | | | 345/173 |
| 2013/0263042 A1* | 10/2013 | Buening | ............. | G06F 3/04883 |
| | | | | 715/783 |
| 2014/0096051 A1 | 4/2014 | Boblett | | |
| 2014/0164990 A1* | 6/2014 | Kim | ...................... | G06F 3/0488 |
| | | | | 715/788 |
| 2014/0168062 A1* | 6/2014 | Katz | ...................... | G06F 3/167 |
| | | | | 345/156 |
| 2016/0046188 A1 | 2/2016 | Wild | | |

FOREIGN PATENT DOCUMENTS

| | | |
|---|---|---|
| CN | 102622164 A | 8/2012 |
| CN | 102789363 A | 11/2012 |
| CN | 103294401 A | 9/2013 |
| CN | 103593108 A | 2/2014 |
| CN | 107765968 A | 3/2018 |
| CN | 109828850 A | 5/2019 |
| CN | 109947325 A | 6/2019 |
| EP | 2698708 A1 | 2/2014 |
| EP | 3037938 A1 | 6/2016 |
| WO | 2012177811 A1 | 12/2012 |

OTHER PUBLICATIONS

European Search Report for corresponding application EP20893644; Report dated Jun. 2, 2022.

* cited by examiner

ELECTRONIC DEVICE AND DRIVING METHOD THEREFOR, DRIVING MODULE, AND COMPUTER-READABLE STORAGE MEDIUM

CROSS REFERENCE

This application is a National Stage Filing of the PCT International Application No. PCT/CN2020/127478 filed on Nov. 9, 2020, which claims priority to Chinese Patent Application No. 201911179128.8 filed on Nov. 27, 2019, the entirety of which is herein incorporated by reference.

TECHNICAL FIELD

The present disclosure relates to the technical field of electrons, and specifically relates to a driving method for an electronic device, a driving module for executing the driving method, an electronic device, and a computer-readable storage medium.

BACKGROUND

At present, the performance of a smart phone can fully satisfy multiple applications to be simultaneously operated, but the simultaneous operation is limited by the size of a screen of the smart phone. In order to ensure a good usage experience, when a user needs to use multiple applications, the user has to switch back and forth between all the applications, and it is really hard to realize simultaneous use of the multiple applications in its true sense.

In recent years, with the increasing maturity of flexible screen technologies, folding screen mobile phones emerge. The original smaller mobile phone screens have been expanded, making it possible to use multiple applications in the same screen region at the same time. In the related art, simultaneous operation of two applications is mainly realized by providing a split-screen mode, that is, after two applications are launched, corresponding interfaces of the two applications are simultaneously displayed through the split-screen mode in a multitask mode.

SUMMARY

As an aspect of the embodiments of the present disclosure, a driving method for an electronic device is provided. The electronic device includes a touch display panel, and a display surface of the touch display panel is divided into multiple application launching regions. The driving method includes:

determining a movement trajectory of a touch point that is at least partially overlapped with an appearance identifier of an application program; and in a case where an end point of the movement trajectory is located in one of the multiple application launching regions, displaying an application interface of the application program in the application launching region in which the end point of the movement trajectory is located.

As another aspect of the embodiments of the present disclosure, a driving module for an electronic device is provided. The electronic device includes a touch display panel, and a display surface of the touch display panel is divided into multiple application launching regions. The driving module includes:

a touch driving unit, configured to determine a movement trajectory of a touch point that is at least partially overlapped with an appearance identifier of an application program; and a display driving unit, configured to display, in a case where an end point of the movement trajectory is located in one of the multiple application launching regions, an application interface of the application program in the application launching region in which the end point of the movement trajectory is located.

As still another aspect of the embodiments of the present disclosure, an electronic device is provided. The electronic device includes:

a touch display panel;

a memory module storing an application program; and one or more processors, wherein the one or more first processors, when executing the application program, is configured to implement the above-mentioned driving method.

As still another aspect of the embodiments of the present disclosure, a computer-readable storage medium is provided. The computer-readable storage medium stores an executable program. The executable program, when executed, can realize the above-mentioned driving method.

BRIEF DESCRIPTION OF THE DRAWINGS

The accompanying drawings are used to provide a further understanding of the technical solutions of the present disclosure, and constitute a part of the specification. They are used to explain the technical solutions of the present disclosure together with the following exemplary implementations, but do not constitute a limitation to the technical solutions of the present disclosure. In the drawings.

DETAILED DESCRIPTION

Exemplary implementations of the technical solutions of the present disclosure will be described in detail below with reference to the accompanying drawings. It should be understood that the exemplary implementations described herein are only used to illustrate and explain the technical solutions of the present disclosure, and are not intended to limit the technical solutions of the present disclosure.

Figure 1:
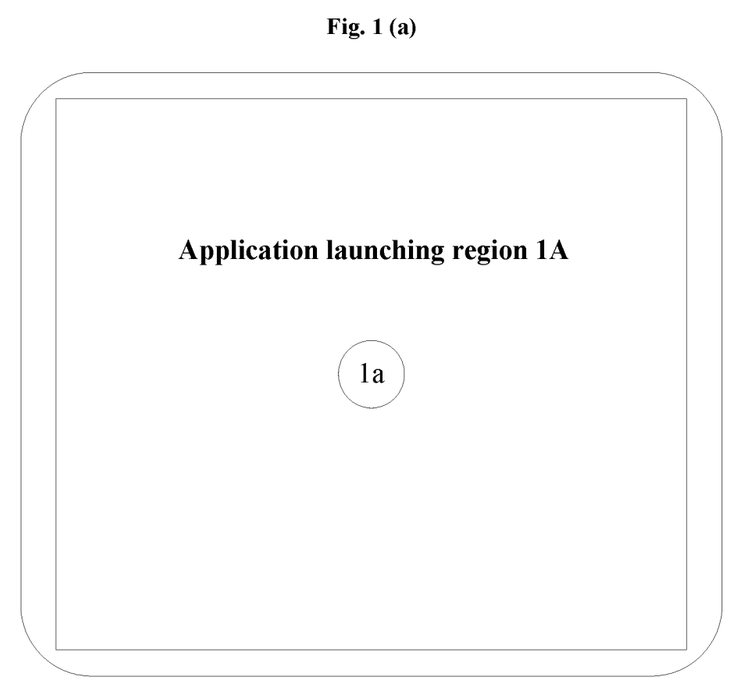
FIG. 1 is a schematic diagram of an application launching region of a display surface in the embodiments of the present disclosure.
Figure 2:
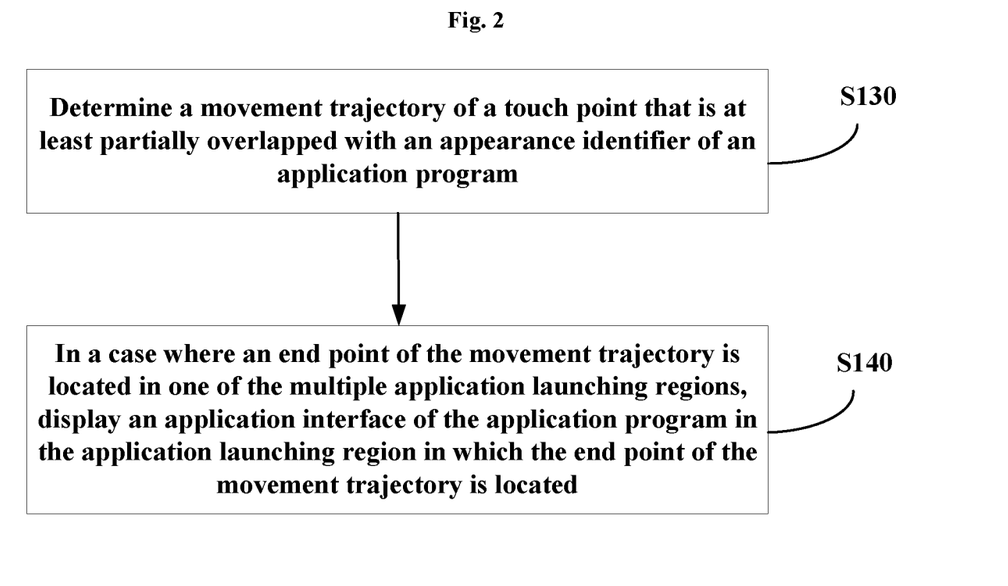
FIG. 2 is a flow diagram of a driving method provided in the embodiments of the present disclosure.

As an aspect of the embodiments of the present disclosure, a driving method for an electronic device is provided. The electronic device includes a touch display panel. As shown in FIG. 1, a display surface of the touch display panel is divided into multiple application launching regions. As shown in FIG. 2, the driving method includes operations S130 and S140 which are described in detailed below.

At S130, a movement trajectory of a touch point that is at least partially overlapped with an appearance identifier of an application program is determined.

At S140, in a case where an end point of the movement trajectory is located in one of the multiple application launching regions, an application interface of the application program is displayed in the application launching region in which the end point of the movement trajectory is located.

In the embodiments of the present disclosure, the application launching region illustrated may be set before delivery of the electronic device, or may be set by a user during initialization of the electronic device, or may be set by the user in a use process of the electronic device. The specific setting process of the application launching regions is not limited in the embodiments of the present disclosure.

FIG. 1(a) (b) (c) (d) respectively correspond to four situations in which the entire display surface of the touch display panel is used as one application launching region or is divided into multiple application launching regions. FIG. 1(a) corresponds to a situation in which the whole display surface is used as one application launching region; FIG. 1(b) and FIG. 1(c) correspond to situations in which the display surface is divided into two application launching regions; and FIG. 1(d) corresponds to a situation in which the whole display surface is divided into four application launching regions. It should be noted that FIG. 1 separately illustrates the four situations (a) (b) (c) (d) for clearer description only, but it does not mean that the four situations (a) (b) (c) (d) are in conflict with each other. In some implementations, the same electronic device can realize the four situations shown in (a) (b) (c) (d), and a user may select and switch between the four situations (a) (b) (c) (d) according to a need.

In the embodiments of the present disclosure, there is no special limitation to a specific division method for dividing the display surface into multiple application launching regions. FIG. 1 is only an exemplary description of the division method. In actual application, the quantity of the application launching regions divided by the division method for dividing a display panel into multiple application launching regions is not limited to the example shown in FIG. 1. For example, for a folding flexible screen, a folding line may be used as a boundary to divide the display surface of the screen into a corresponding number of application launching regions.

In addition, when the display surface is divided into multiple application launching regions, the display surface may be divided according to any ratio, and is not limited to be equally divided. In some implementations, the sizes and proportions of the various application launching regions may be arbitrarily adjusted. In some implementations, adjacent application launching regions may be combined, so as to adjust the sizes and proportions of the various application launching regions. In some exemplary implementations, the above-mentioned combined application launching region formed by combining the adjacent application launching regions may be a preset application launching region, or may not be a preset application launching region, but a new application launching region generated by combining the adjacent application launching regions.

In the embodiments of the present disclosure, at S130, the movement trajectory of the touch point that is at least partially overlapped with the appearance identifier of the application program is detected. At S140, in a case where the touch point moves from a start point to one of the multiple application launching regions, the application interface of the application program corresponding to the above-mentioned appearance identifier is directly displayed in the application launching region in which the end point of the movement trajectory is located. For example, in FIG. 1, in a case where the end point of the movement trajectory of the touch point that is partially overlapped with the appearance identifier of the application program A is in the application launching region 2C, the application interface of the application program A is displayed in the application launching region 2C. In a case where the end point of the movement trajectory of the touch point that is partially overlapped with the appearance identifier of the application program B is in the application launching region 3D, the application interface of the application program B is displayed in the application launching region 3D. In a case where the end point of the movement trajectory of the touch point that is partially overlapped with the appearance identifier of the application program C is in the application launching region 3B, the application interface of the application program C is displayed in the application launching region 3B. According to the above-mentioned method, the application interfaces of multiple different application programs can be displayed in different application launching regions, so that split-screen displaying of multiple applications can be realized without entering a multitask mode.

It should be noted that the touch point in the embodiments of the present disclosure is neither a geometrical point, nor a certain pixel on the display surface of the display panel, but is a touch region corresponding to a single touch operation.

By use of the driving method provided in the embodiments of the present disclosure, the display surface of the display panel is divided into the multiple application launching regions, so that if the icon or application interface of the application program is dragged into one application launching region, the application interface of the application program can be displayed in the application launching region, and the display panel can simultaneously display two or more application programs and display the corresponding application interfaces, which simplifies the operation of launching and displaying multiple application programs and enhances the interaction experience of the user.

The driving method provided in the embodiments of the present disclosure can be applied to the launching process of the application program, so as to launch the application program in the specified application launching region. The driving method can also be applied to adjusting a display region of a launched application program. Correspondingly, in the embodiments of the present disclosure, the appearance identifier at S130 is an icon of the application program, or an application interface after the application program is launched.

Figure 3:
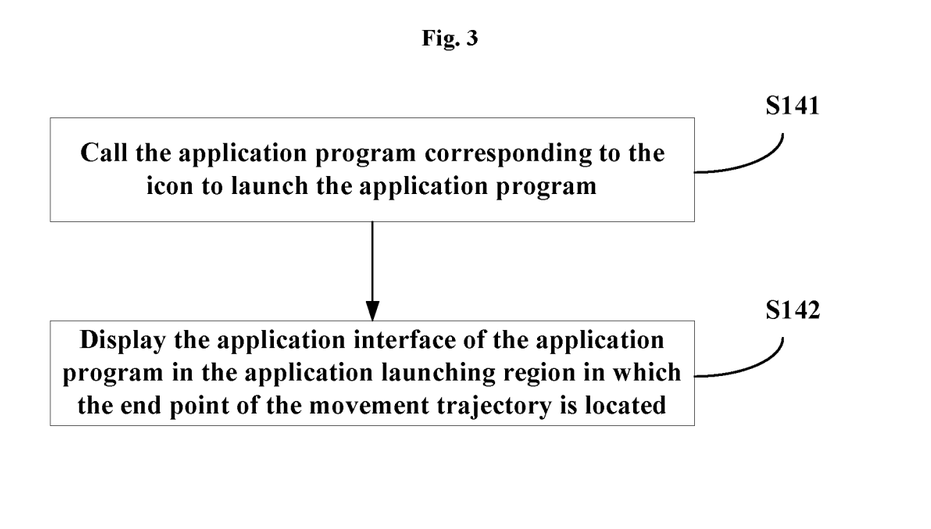
FIG. 3 is a flow diagram of another driving method provided in the embodiments of the present disclosure.

In a case where the appearance identifier of the application program is the icon of the application program, it means that the application program corresponding to this icon has not yet been launched. Therefore, the application program corresponding to the icon needs to be called into a memory first, and the application interface of the application program is then displayed. Correspondingly, as shown in FIG. 3, in a case where the end point of the movement trajectory is in one of the multiple application launching regions, S140 may include the following operations S141 and S142.

At S141, the application program corresponding to the icon is called to launch the application program.

At S142, the application interface of the application program is displayed in the application launching region in which the end point of the movement trajectory is located.

Figure 4:
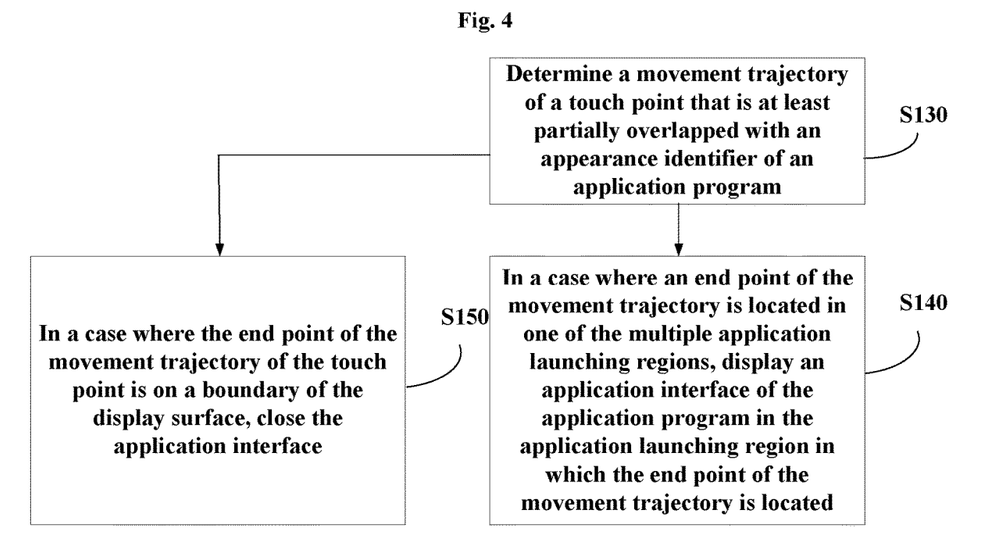
FIG. 4 is a flow diagram of yet another driving method provided in the embodiments of the present disclosure.

In a case where the appearance identifier of the application program is the application interface after the application program is launched, it means that this application program has already been launched. The embodiments of the present disclosure provide a mechanism for closing the application interface of the application program that has been launched, that is, it may be determined whether the touch point that is partially overlapped with the application interface after the application program is launched reaches a boundary of the display surface, and if the touch point reaches the boundary of the display surface, it means that the user wants to close this application program. FIG. 4 illustrates an implementation for closing the application interface of the application program. As shown in FIG. 4, besides the above-mentioned S130 and S140, the driving method may further include an operation S150.

At S150, in a case where the end point of the movement trajectory of the touch point is on a boundary of the display surface, the application interface is closed.

It should be noted that in a case where the end point of the movement trajectory of the touch point is on the boundary of the display surface, a corresponding touch operation may be an operation of sliding out of the display surface region, instead of being strictly defined as an operation of sliding to the boundary of the display surface. In the embodiments of the present disclosure, the closing the application interface includes clearing away the application program from the memory to thoroughly close the application program, or only closing the application interface of the application program and keeping the application program in the memory.

In the embodiments of the present disclosure, in order to more accurately determine whether the end point of the movement trajectory of the touch point is located in one of the application launching regions and which application launching region, as shown in FIG. 1, each of the multiple application launching regions may be configured with a launching region identification point. In a case where the touch point reaches the launching region identification point, it can be determined that the end point of the movement trajectory is located in the application launching region corresponding to the launching region identification point.

For example, the launching region identification point 2a corresponds to the application launching region 2A, and the launching region identification point 3c corresponds to the application launching region 3C. In a case where the end point of the movement trajectory of the touch point is located at the launching region identification point 2a, the application interface of the application program is displayed in the application launching region 2A. In a case where the end point of the movement trajectory of the touch point is located at the launching region identification point 3c, the application interface of the application program is displayed in the application launching region 3C.

Figure 5:
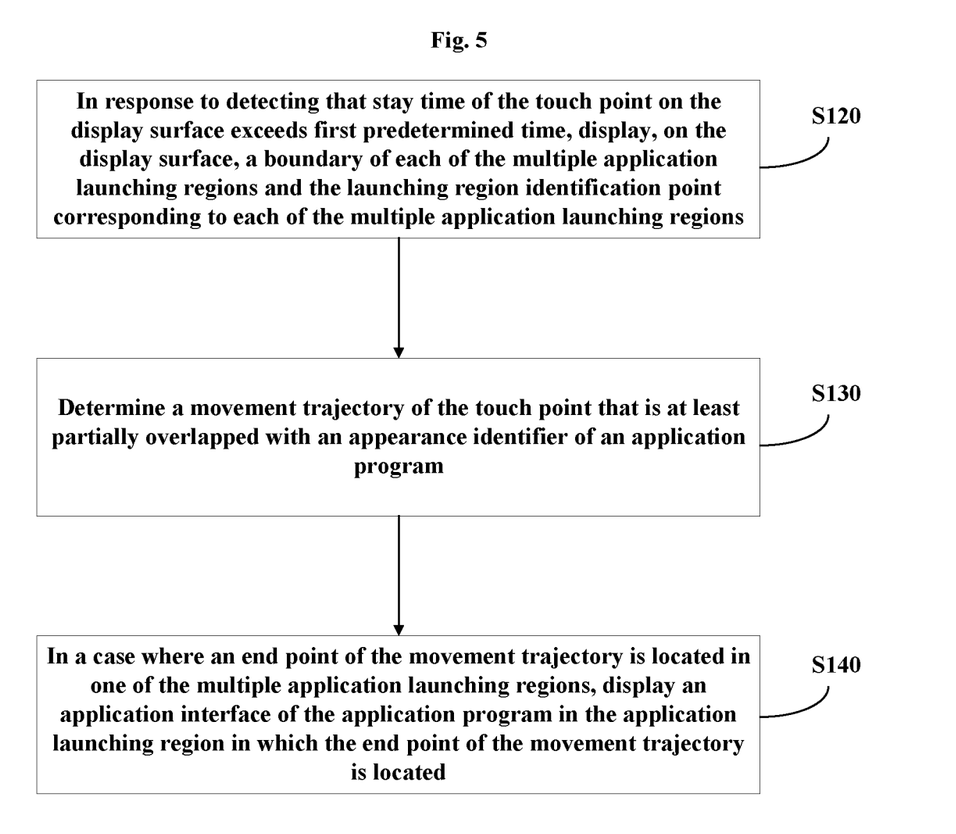
FIG. 5 is a flow diagram of yet another driving method provided in the embodiments of the present disclosure.

In the embodiments of the present disclosure, in a case where the user makes a long press on the appearance identifier of the application program, a boundary of each of the multiple application launching regions and the corresponding launching region identification point can be displayed, which contributes to helping the user to drag the application program to a desired application launching region more conveniently and accurately, so as to display the application interface of the application program in the desired application launching region. In the embodiments of the present disclosure, the long press operation of the user is detected by determining stay time of the touch point on the display surface. FIG. 5 illustrates an implementation for displaying the boundary of each of the multiple application launching regions and the launching region identification point corresponding to each of the multiple application launching regions. As shown in FIG. 5, besides the above-mentioned S130 and S140, before S130 is executed, the driving method may further include an operation S120.

At S120, in response to detecting that stay time of the touch point on the display surface exceeds first predetermined time, the boundary of each of the multiple application launching regions and the launching region identification point corresponding to each of the multiple application launching regions are displayed on the display surface.

Figure 6:
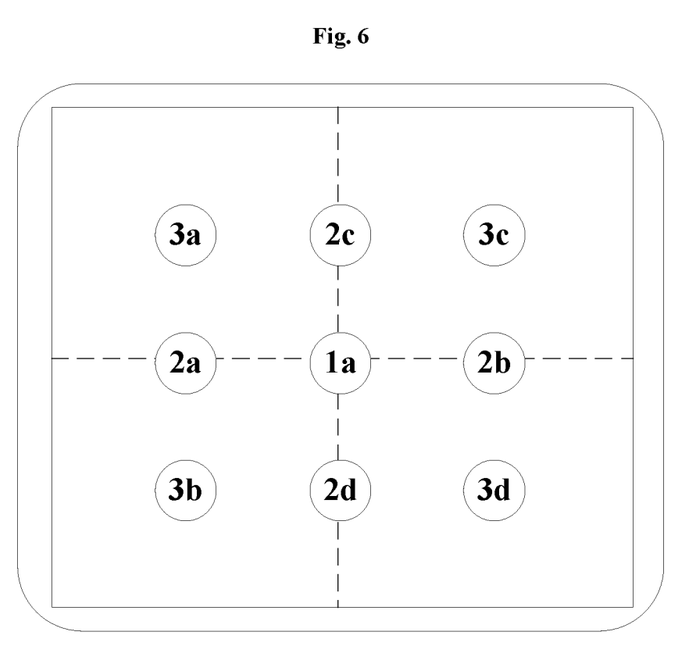
FIG. 6 is a schematic diagram of application launching regions and launching region identification points in the embodiments of the present disclosure.

FIG. 6 illustrates an exemplary mode for displaying the boundary of each of the multiple application launching regions and the corresponding launching region identification point. It should be noted that FIG. 6 is only an exemplary description of the above-mentioned display mode. In actual application, displaying of the boundary of each of the multiple application launching regions and the corresponding launching region identification point is not limited to the example shown in FIG. 6.

Figure 7:
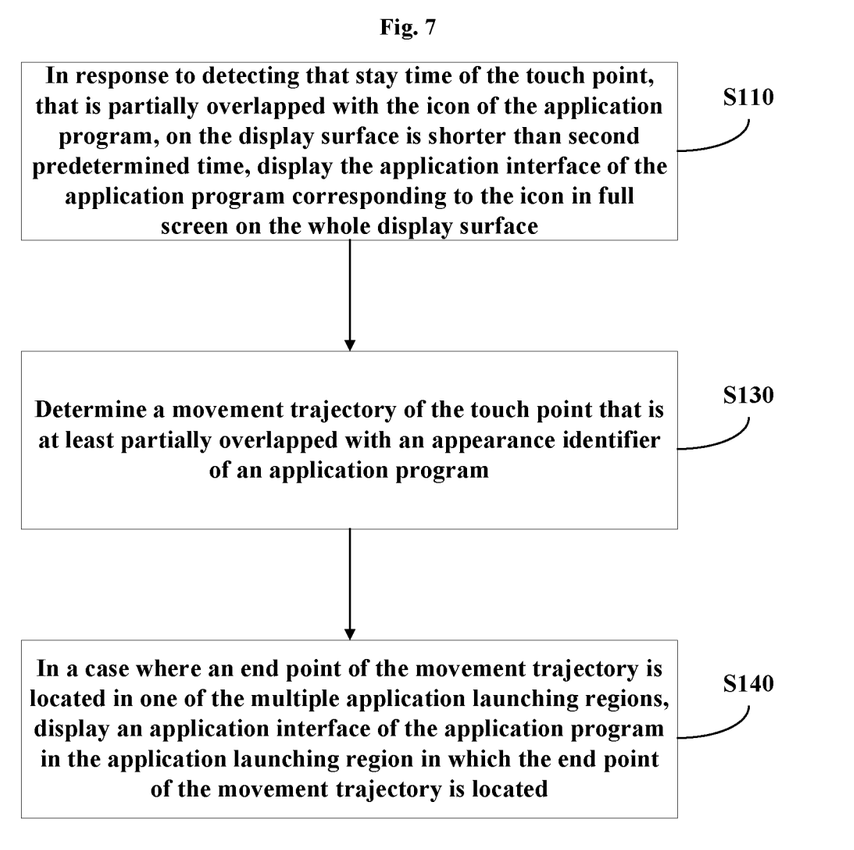
FIG. 7 is a flow diagram of yet another driving method provided in the embodiments of the present disclosure.

In addition, in the embodiments of the present disclosure, full-screen displaying of the application interface of the application program on the whole display surface can be realized by means of dragging the appearance identifier of the application program or making a single click on the icon of the application program. For example, the icon of the application program or the application interface of the application program that has been launched is dragged to the launching region identification point 1a in FIG. 6, and a corresponding display situation is the situation (a) in FIG. 1, i.e., full-screen displaying is realized. FIG. 7 illustrates an implementation for displaying the application interface of the application program in full screen by a single click on the application program. As shown in FIG. 7, besides the above-mentioned S130 and S140, the driving method may further include an operation S110.

At S110, in response to detecting that stay time of the touch point, that is partially overlapped with the icon of the application program, on the display surface is shorter than second predetermined time, the application interface of the application program corresponding to the icon is displayed in full screen on the whole display surface.

It should be noted that the technical solution of the embodiments of the present disclosure does not limit the execution order of S110 with respect to S130 and S140. FIG. 7 only exemplarily illustrates that S110 is executed before S130.

In the embodiments of the present disclosure, the first predetermined time and the second predetermined time shall satisfy that the first predetermined time is longer than the second predetermined time. In a case where the above-mentioned relationship is satisfied, the embodiments of the present disclosure do not make any limitation on the specific durations of the first predetermined time and the second predetermined time.

It should be further noted that in actual application, different operations in all the driving methods provided in the embodiments of the present disclosure can be combined to obtain a new technical solution. The new technical solution shall also fall within the protection scope of the present disclosure.

Specification application scenarios of the driving method provided in the embodiments of the present disclosure are provided below.

Scenario I: the application program may be launched in one of the multiple application launching regions.

The application program may be launched by the following method.

In a case where the user makes a single click on the icon of the application program, the application interface of the application program is displayed in full screen on the whole display surface.

In a case where the user drags the icon of the application program to the launching region identification point corresponding to the application launching region that represents full-screen displaying, the application interface of the application program is displayed in full screen on the whole display surface.

In a case where the user drags the icon of the application program to one of the multiple application launching regions, the application interface of the application program is displayed in the application launching region.

Scenario II: the application launching regions are switched for the application program launched in a certain application launching region.

The application launching regions can be switched by the following method.

In a case where the user drags the application interface of the application program to an application launching region except the current application launching region, the application interface of the application program is displayed in the application launching region except the current application launching region.

Scenario III: the application interface of the application program is closed.

In a case where the user drags the application interface of the application program to the boundary of the display surface or outside the display surface, the application interface of the application program is closed.

Figure 8:
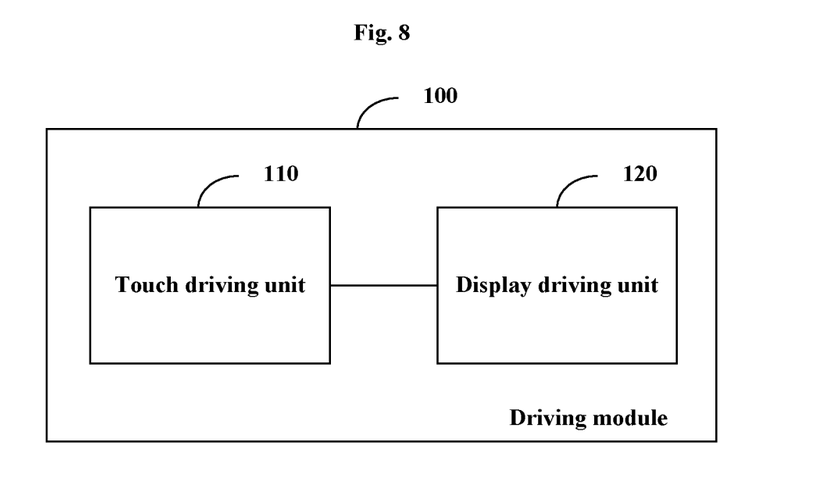
FIG. 8 is a schematic module diagram of a driving module provided in the embodiments of the present disclosure.

As another aspect of the embodiments of the present disclosure, a driving module 100 for an electronic device is provided. The electronic device includes a touch display panel, and a display surface of the touch display panel is divided into multiple application launching regions. As shown in FIG. 8. the driving module 100 includes:

a touch driving unit 110, configured to determine a movement trajectory of a touch point that is at least partially overlapped with an appearance identifier of an application program; and a display driving unit 120, configured to display, in a case where an end point of the movement trajectory is located in one of the multiple application launching regions, an application interface of the application program in the application launching region in which the end point of the movement trajectory is located.

The driving module provided in the embodiments of the present disclosure is used for executing the driving method provided in the embodiments of the present disclosure. The driving method has been described above in detail, and descriptions thereof are omitted here.

As still another aspect of the embodiments of the present disclosure, an electronic device is provided. The electronic device includes:

a touch display panel;

a memory module storing an application program; and one or more processors, wherein the one or more first processors, when executing the application program, is configured to implement the above-mentioned driving method.

As still another aspect of the embodiments of the present disclosure, a computer-readable storage medium is provided. The computer-readable storage medium stores an executable program. The executable program, when executed, can realize the above-mentioned driving method.

In the embodiments of the present disclosure, the computer-readable storage medium includes volatile, nonvolatile, removable, and non-removable memory media implemented by any method or technology for storing information (such as a computer-readable instruction, a data structure, a program module, or other data). The computer-readable storage medium includes, but is not limited to, a random access memory (RAM), a read-only memory (ROM), an electrically erasable programmable read-only memory (EEPROM), a flash memory, a CD-ROM, a digital versatile disk (DVD), a magnetic cassette, a magnetic tape, a disk storage, or any other media capable of being used for storing desired information and being accessed by a computer.

According to the technical solution of the embodiments of the present disclosure, the display surface of the display panel is divided into multiple application launching regions, so that if the icon or application interface of the application program is dragged into any application launching region, the application interface of the application program can be displayed in the application launching region, and the display panel can simultaneously display the application interfaces of two or more application programs, which simplifies the operation of launching multiple application programs and displaying the application interfaces of the multiple application programs, and enhances the interaction experience of the user.

It can be understood that the above implementations are merely exemplary implementations used to illustrate the principles of the technical solutions of the embodiments of the present disclosure, but the technical solutions of the embodiments of the present disclosure are not limited thereto. For those having ordinary skill in the art, various modifications and improvements can be made without departing from the essence of the present disclosure, and these modifications and improvements are also deemed to fall within the protection scope of the present disclosure.

What is claimed is:

1. A driving method for an electronic device, wherein the electronic device comprises a touch display panel, a display surface of the touch display panel is divided into multiple application launching regions, and each of the multiple application launching regions is configured with a launching region identification point; the driving method comprises:

determining a movement trajectory of a touch point that is at least partially overlapped with an appearance identifier of an application program; and in a case where an end point of the movement trajectory is located in one of the multiple application launching regions, displaying an application interface of the application program in the application launching region in which the end point of the movement trajectory is located, wherein in a case where the touch point reaches the launching region identification point, the end point of the movement trajectory is determined to be located in the application launching region corresponding to the launching region identification point;

wherein before determining the movement trajectory of the touch point that is partially overlapped with the appearance identifier of the application program, the method further comprises: in response to detecting that stay time of the touch point, that is partially overlapped with the appearance identifier of the application program, on the display surface exceeds first predetermined time, displaying, on the display surface, a boundary of each of the multiple application launching regions and the launching region identification point corresponding to each of the multiple application launching regions.

2. The driving method according to claim 1, wherein a folding line of a folding flexible screen is used as the boundary to divide the display surface of the folding flexible screen into a corresponding number of application launching regions.

3. The driving method according to claim 1, wherein a launching region identification point corresponding to the application launching region that represents full-screen displaying is configured, and in a case where the touch point reaches the launching region identification point, the application interface of the application program is displayed in full screen on the whole display surface.

4. The driving method according to claim 1, wherein in a case where the user drags the application interface of the application program to an application launching region except the current application launching region, the application interface of the application program is displayed in an application launching region except the current application launching region.

5. The driving method according to claim 1, further comprising:
in response to detecting that stay time of the touch point, that is partially overlapped with the icon of the application program, on the display surface is shorter than second predetermined time, displaying the application interface of the application program corresponding to the icon in full screen on the whole display surface.

6. The driving method according to claim 5, wherein the first predetermined time is longer than the second predetermined time.

7. The driving method according to claim 1, wherein the appearance identifier of the application program is an icon of the application program, or the appearance identifier of the application program is an application interface after the application program is launched.

8. The driving method according to claim 7, wherein in a case where the appearance identifier is the application interface after the application program is launched, the driving method further comprises:
in a case where the end point of the movement trajectory of the touch point is on a boundary of the display surface, closing the application interface.

9. The driving method according to claim 7, wherein in a case where the appearance identifier of the application program is the icon of the application program, displaying the application interface of the application program in the application launching region in which the end point of the movement trajectory is located in the case where the end point of the movement trajectory is located in one of the multiple application launching regions comprises:
calling the application program corresponding to the icon to launch the application program; and
displaying the application interface of the application program in the application launching region in which the end point of the movement trajectory is located.

10. The driving method according to claim 9, further comprising:
in response to detecting that stay time of the touch point, that is partially overlapped with the icon of the application program, on the display surface is shorter than second predetermined time, displaying the application interface of the application program corresponding to the icon in full screen on the whole display surface.

11. A driving module for an electronic device, wherein the electronic device comprises a touch display panel, a display surface of the touch display panel is divided into multiple application launching regions, and each of the multiple application launching regions is configured with a launching region identification point; the driving module comprises a memory storing instructions and a processor in communication with the memory, wherein the processor is configured to execute the instructions to:
determine a movement trajectory of a touch point that is at least partially overlapped with an appearance identifier of an application program; and
display, in a case where an end point of the movement trajectory is located in one of the multiple application launching regions, an application interface of the application program in the application launching region in which the end point of the movement trajectory is located, wherein in a case where the touch point reaches the launching region identification point, the processor is configured to determine the end point of the movement trajectory to be located in the application launching region corresponding to the launching region identification point;
wherein the processor is further configured to:
before determining the movement trajectory of the touch point that is partially overlapped with the appearance identifier of the application program, in response to detecting that stay time of the touch point, that is partially overlapped with the appearance identifier of the application program, on the display surface exceeds first predetermined time, display, on the display surface, a boundary of each of the multiple application launching regions and the launching region identification point corresponding to each of the multiple application launching regions.

12. The driving module according to claim 11, wherein the appearance identifier of the application program is an icon of the application program, or the appearance identifier of the application program is an application interface after the application program is launched.

13. The driving module according to claim 12, wherein in a case where the appearance identifier of the application program is the icon of the application program, the processor is configured to:
call the application program corresponding to the icon to launch the application program; and
display the application interface of the application program in the application launching region in which the end point of the movement trajectory is located.

14. The driving module according to claim 12, wherein in a case where the appearance identifier is the application interface after the application program is launched, the processor is further configured to:
in a case where the end point of the movement trajectory of the touch point is on a boundary of the display surface, close the application interface.

15. An electronic device, comprising:
a touch display panel, wherein a display surface of the touch display panel is divided into multiple application launching regions, and each of the multiple application launching regions is configured with a launching region identification point;
a memory module storing an application program; and
one or more processors, wherein the one or more first processors, when executing the application program, is configured to:

determine a movement trajectory of a touch point that is at least partially overlapped with an appearance identifier of an application program; and in a case where an end point of the movement trajectory is located in one of the multiple application launching regions, display an application interface of the application program in the application launching region in which the end point of the movement trajectory is located, wherein in a case where the touch point reaches the launching region identification point, the processor is configured to determine the end point of the movement trajectory to be located in the application launching region corresponding to the launching region identification point;

wherein the processor is further configured to:

before determining the movement trajectory of the touch point that is partially overlapped with the appearance identifier of the application program, in response to detecting that stay time of the touch point, that is partially overlapped with the appearance identifier of the application program, on the display surface exceeds first predetermined time, display, on the display surface, a boundary of each of the multiple application launching regions and the launching region identification point corresponding to each of the multiple application launching regions.

16. A non-transitory computer-readable storage medium, wherein the computer readable storage medium stores an executable program; and the executable program, when executed by a processor, causes the processor to implement a driving method for an electronic device, wherein the electronic device comprises a touch display panel, a display surface of the touch display panel is divided into multiple application launching regions, and each of the multiple application launching regions is configured with a launching region identification point; the driving method comprises:

determining a movement trajectory of a touch point that is at least partially overlapped with an appearance identifier of an application program; and in a case where an end point of the movement trajectory is located in one of the multiple application launching regions, displaying an application interface of the application program in the application launching region in which the end point of the movement trajectory is located, wherein in a case where the touch point reaches the launching region identification point, the end point of the movement trajectory is determined to be located in the application launching region corresponding to the launching region identification point;

wherein before determining the movement trajectory of the touch point that is partially overlapped with the appearance identifier of the application program, the method further comprises: in response to detecting that stay time of the touch point, that is partially overlapped with the appearance identifier of the application program, on the display surface exceeds first predetermined time, displaying, on the display surface, a boundary of each of the multiple application launching regions and the launching region identification point corresponding to each of the multiple application launching regions.

* * * * *